Figure 1:
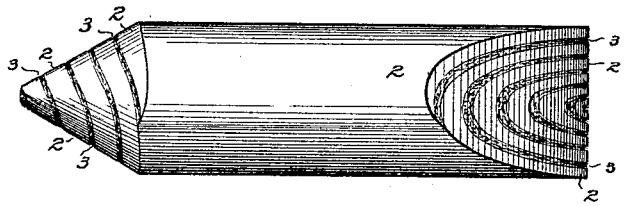

(No Model.)

F. H. HOLTON.
ERASIVE RUBBER.

No. 328,778. Patented Oct. 20, 1885.

Attest:
Geo. H. Graham
A. N. Jasbera

Inventor
Francis H. Holton
by Munson & Philipp
Attys.

UNITED STATES PATENT OFFICE.

FRANCIS H. HOLTON, OF BROOKLYN, NEW YORK, ASSIGNOR TO FRANCIS H. HOLTON, JR., OF SAME PLACE.

ERASIVE RUBBER.

SPECIFICATION forming part of Letters Patent No. 328,778, dated October 20, 1885.

Application filed January 6, 1885. Serial No. 152,125. (No model.)

*To all whom it may concern:*

Be it known that I, FRANCIS H. HOLTON, a citizen of the United States, residing at Brooklyn, county of Kings, and State of New York, have invented certain new and useful Improvements in Erasive Rubbers, fully described and represented in the following specification and the accompanying drawings, forming a part of the same.

This invention relates to the article of commerce known as "erasive rubber," which is commonly sold in blocks, tablets, and points suited for hand manipulation.

It is the object of this invention to produce a block or tablet of erasive rubber that shall possess the erasive quality in a high degree and yet be firm and solid.

The invention consists in a block or tablet consisting of alternate layers or strata composed of different kinds or qualities of rubber, as will more fully hereinafter appear.

Erasive tablets, blocks, or points, as commonly made, consist of a single piece of one kind or quality of rubber, vulcanized more or less, according to the degree of solidity or firmness required. The most common erasive rubber is a granular body composed by combining with pure gum-caoutchouc a quantity of chalk, ground glass, or similar substance, which imparts to the vulcanized body a sufficient strength and solidity and to some degree modifies its erasive quality.

Blocks, tablets, and points made of such rubber, although well suited by reason of their solidity and firmness to be conveniently handled in erasing marks and dirt and cleaning marked or soiled surfaces, readily deteriorate with age and have their erasive and cleaning properties impaired.

Virgin rubber, or such as is comparatively free from impurities or adulteration and but slightly vulcanized, possesses the tacky or erasive quality in the greatest degree, but lacks the strength and rigidity most desirable to enable it to be readily handled and properly pressed upon the surface to be cleaned.

In order to embody in a single mass, as a block, tablet, or point, not only a sufficient strength or stiffness for handling, but the erasive quality in the highest degree, the improved erasive block, tablet, or point is composed of a number of layers or strata, alternate ones of which are made of rubber varying in quality, composition, or vulcanization. Thus alternate layers or strata may be composed of rubber that contains more or less chalk, powdered glass, or other filling, and vulcanized to an extent that renders it quite hard though pliable, and between these layers other layers of virgin rubber or pure rubber that is slightly vulcanized are interposed, all the layers being united together by rubber cement or by virgin rubber and slight further vulcanization. The first-named layers will be hard or somewhat stiff though pliable, and thus impart to the block, tablet, or point the requisite strength and solidity to enable the mass to be handled and forcibly manipulated in the erasure of marks and cleaning surfaces, while the interposed layers of soft rubber, having the erasive quality in a high degree, are firmly held and carried in contact with the surface to be cleaned. The stratified structure thus composed of two qualities of rubber each having different degrees of erasive qualities and different degrees of strength and solidity, one—the hard—being best adapted to erase, and the other—the soft—best adapted to clean, presents an article perfectly suited to perform the function of erasing marks and dirt from and cleaning surfaces.

Figure 2:
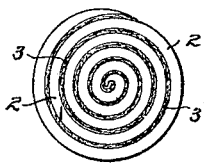
Figure 3:
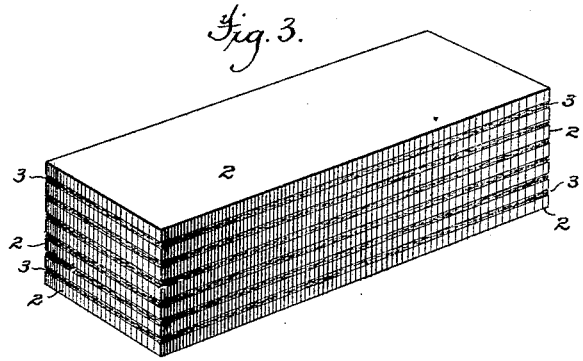

In the drawings illustrating embodiments of this invention, Figure 1 illustrates in elevation an erasive block or point wherein the alternated strata are superimposed by rolling two sheets together, and Fig. 2 an end view thereof, and Fig. 3 is a perspective view of a block or tablet wherein the alternated strata are superimposed by building one upon another.

In practically carrying out the invention any mode of superimposing the strata of differing qualities of rubber may be employed. Thus, to make the block or point shown in Fig. 1, two sheets of rubber are employed. One, which is to form the outside of the block or point, is made of rubber that has incorporated in it a certain amount of chalk or other appropriate ingredient, is given a suitable thickness, and vulcanized to an extent that will give it proper solidity, and upon this is laid a quantity of or a sheet composed of virgin rubber, or such rubber but slightly charged with chalk or other similar modifying or adulterating ingredient, vulcanized to a degree that enables its tacky, erasive quality to be preserved. The two sheets are then rolled together to form the point or block shown, the strata or layers 2 of the hard rubber thus enveloping or holding the strata or layers 3 of soft rubber.

The layers may be caused to unite together so as to practically form a single mass or body by the adhesive character of the soft rubber, or by the use of suitable cement, or by a proper vulcanization of the compound structure.

In the case of the built-up strata or layers 2 of hard rubber and strata or layers 3 of soft rubber, as shown in Fig. 3, the means of uniting will be the same; but, as is evident, this structure will be most economical, as large sheets may be used and united and thereafter be cut into appropriate pieces for sale.

Such a stratified block, tablet, or point will present a multiplicity of wearing-surfaces, and afford in the hard-rubber strata a material not only suitable to cut the surface to be cleaned, but sufficiently solid, strong, and hard to support and carry the interposed soft tacky rubber strata into forcible contact with the surface to be cleaned, and thus, while affording a vehicle for holding and carrying the soft rubber, also provide a means for preventing the soft rubber from rapidly wearing away without performing work, as is the case where soft rubber alone is used.

Of course it should be understood that the soft rubber as well as the hard may be made from any of the compositions and by any of the processes suited for the purpose, and that the soft strata may be composed of sponge rubber, and hence that this invention is only limited to the relative characteristics of the alternate strata—namely, that the erasive material composing alternate layers shall possess different degrees of hardness, or that one shall be comparatively hard and the next comparatively soft. The relative thickness of the strata of hard and soft rubber may vary from that shown. While broadly covered herein, the specific structure of a block, tablet, or mass of rubber composed of alternate layers or strata of solid and cellular rubber is claimed in my companion application, No. 178,331, filed September 28, 1885.

What is claimed is—

1. An erasive block, tablet, or point consisting of superimposed layers, alternate ones of which are composed of rubber of differing qualities, substantially as described.

2. An erasive block, tablet, or point consisting of alternate layers or strata of hard and soft rubber, substantially as described.

3. An erasive block, tablet, or point consisting of alternate layers or strata of hard and soft rubber with an exterior layer or layers of hard rubber, substantially as described.

In testimony whereof I have hereunto set my hand in the presence of two subscribing witnesses.

F. H. HOLTON.

Witnesses:
GEO. H. GRAHAM,
T. H. PALMER.